Figure 1:
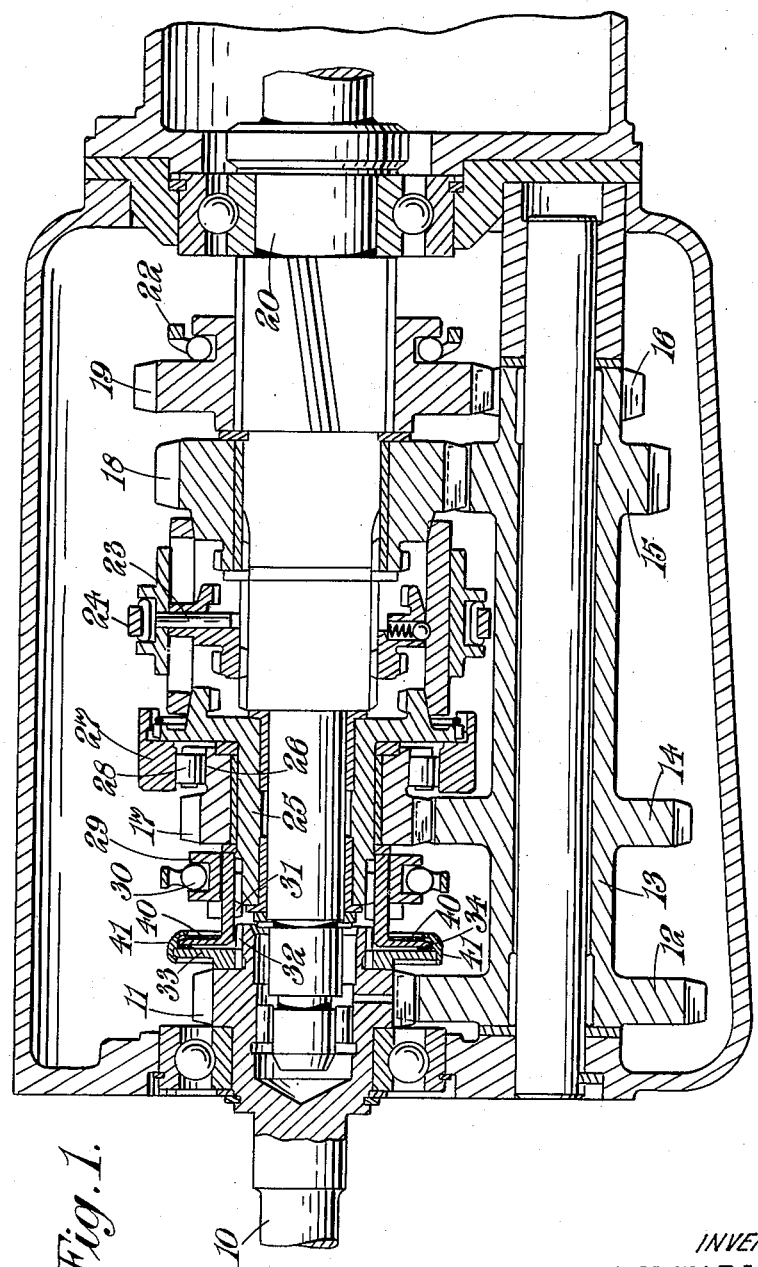

Dec. 5, 1950 F. H. TARLTON 2,532,648
SYNCHROMESH COUPLING
Filed Aug. 11, 1947 3 Sheets-Sheet 1

INVENTOR
FRANK H. TARLTON
by Wilkinson & Mawhinney
ATTORNEYS

Dec. 5, 1950   F. H. TARLTON   2,532,648
SYNCHROMESH COUPLING
Filed Aug. 11, 1947   3 Sheets-Sheet 2
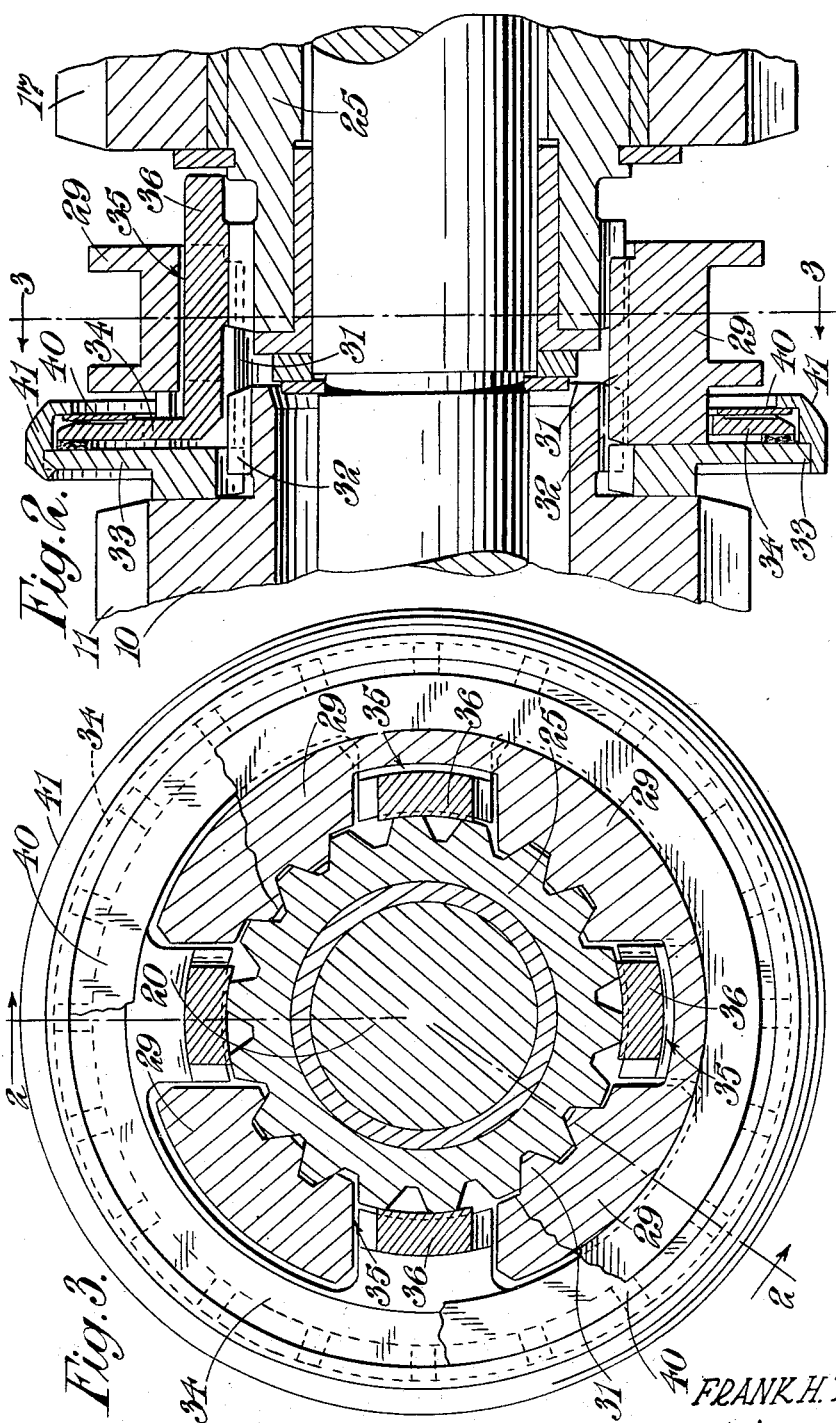
INVENTOR
FRANK H. TARLTON
by Wilkinson Mawhinney
ATTORNEYS

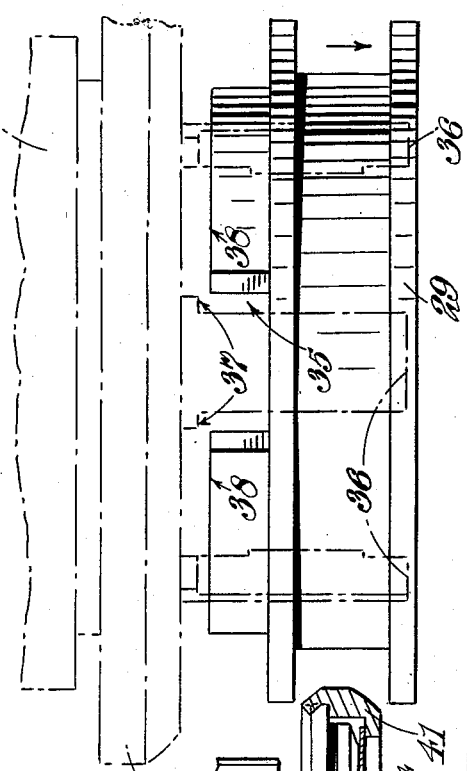
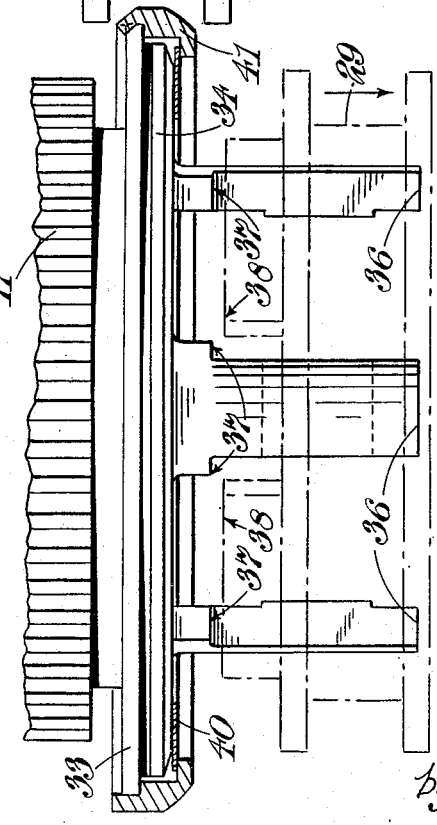

Patented Dec. 5, 1950

2,532,648

UNITED STATES PATENT OFFICE 2,532,648

SYNCHROMESH COUPLING

Frank Henry Tarlton, Alvaston, England, assignor to Rolls-Royce Limited, Derby, England, a British company Application August 11, 1947, Serial No. 767,904
In Great Britain August 19, 1946

6 Claims. (Cl. 74—339)

In my concurrent application Serial No. 767,903, now Patent No. 2,504,904, issued April 18, 1950, there is described and claimed a change-speed-gear, which comprises essentially the combination with an input shaft, an output shaft and trains of gears with different ratios on them arranged for selective engagement, of a free-wheel or other over-running coupling whereof the driven member can be rotatively engaged directly or indirectly with the output shaft, and whereof the driving member is engaged with a gear wheel driven by the input shaft, and means for coupling at will the free-wheel driven member to the input shaft so as to be driven at a higher speed than its co-operating driving member.

The coupling means may comprise for example a sliding toothed member rotating with the free-wheel driven member and capable of being engaged with and disengaged from a second toothed member at will, the latter being directly or indirectly driven by the input shaft.

With such change-speed gears, a change of gear can be effected by use of the said coupling means without the necessity of disconnecting the engine from the input shaft. Such a change of gear may be termed a clutchless change in that actuation of the normal pedal-operated clutch provided in motor vehicles between the engine and change-speed gear is not necessary.

This invention relates to means for preventing engagement of the toothed members of the coupling means until their speeds are synchronised.

In the usual forms of synchromesh coupling the synchronizing of the two toothed members which are to be engaged with one another has hitherto been effected by providing co-operating frictional cone-clutch-elements on the two toothed members, which friction-elements are engaged with one another in the first stage of the engaging movement. The cone on the sliding toothed member is free to move through a small angle relatively to its toothed member, and this relative movement causes a lug on the toothed member to enter a notch in the side of a longitudinal slot in the cone member. The side of the notch and the face of the lug are inclined to the axis of rotation so that axial pressure on the toothed member cannot disengage it so long as the cone-clutch is slipping and a torque is being transmitted through it. As soon however, as the speeds of the two toothed members are synchronised, the applied axial pressure causes the lug to slide along the inclined side of the notch to a central position in the slot and the continued axial pressure on the toothed member is able to move it into full engagement with its co-operating toothed member. In such constructions therefore the complete meshing of the toothed members is initially prevented by the sloping faces of the notch and lug acting as an interceptor to axial movement of the toothed member, and is finally effected by their operation as cam members movable under the applied axial pressure. The baulking effect of the sloping faces is not positive however and can be over-ridden by force.

The object of this invention is to provide for use in a change-speed-gear of the kind described in the specification of my concurrent patent application Serial No. 767,903, an improved construction of coupling to prevent engagement of the toothed members until their speeds are synchronised.

According to this invention, a coupling comprises two toothed members whereof one is slidable into and out from engagement with the other, a pair of frictional clutch-elements rotatably associated one with each of the toothed members, the frictional element associated with one of the toothed members being capable of having a degree of angular movement with respect to said toothed member and having a tail or tails each of which has an intercepting face to engage a co-operating face on the said toothed member and which is capable of entering a slot in said member when the intercepting faces are disengaged, said intercepting faces being normal to the axis of rotation of the coupling whereby they provide only recognition or detection of synchronism and the final engaging movement of the sliding toothed member is effected with the intercepting faces disengaged. In the prior constructions of synchronising means above described, the intercepting faces are inclined to the rotational axis and have a cam action operative during the final engaging movement of the sliding toothed member.

Preferably the co-operating frictional members are constituted by discs associated respectively with the toothed members, so that as compared with constructions in which cone frictional elements are provided, the coupling is substantially reduced in size and is thereby more easily accommodated in a change-speed-gear and it enables the bulk and weight of the latter to be reduced.

According to a feature of this invention, the discs are pressed together by a light spring to ensure a substantially constant drag between them, and to ensure that the discs are in contact at the instant before the intercepting face of the sliding toothed member reaches the plane of the intercepting face on the tail or tails.

One embodiment of this invention will now be described by way of example as applied to a change-speed gear box such as is described and claimed in my concurrent application Serial No. 767,903. The description has reference to the accompanying drawings in which Figure 1 is a diagrammatic section through the gear box, Figure 2 is an enlarged view of a portion of Figure 1 and is taken as a section on a line 2—2 of Figure 3, Figure 3 is a section on a line 3—3 of Figure 2, Figures 4 and 5 show in plan parts of the means for ensuring synchronism and their manner of engagement with other parts of the change-speed-gear.

Referring to the drawings the change-speed-gear comprises an input shaft 10 carrying a gear wheel 11 which is constantly in mesh with a gear wheel 12 on a lay shaft 13. The lay shaft also carries gear wheels 14, 15 and 16 meshing with gear wheels 17, 18 and 19 mounted co-axially on an output shaft 20. The gear wheel 19 is capable of axial movement under control of fork 22 along the output shaft 20 so as to occupy a position in which it meshes with the gear wheel 16, or is in a neutral position, or meshes with a reverse gear train which is not shown. A synchromesh coupling indicated generally by reference numeral 23 is provided to couple the gear wheel 18 to the output shaft in one position of its sliding dog to give the second gear ratio, or to couple the output shaft 20 to a hollow shaft 25 rotatably mounted on the output shaft. Drivingly engaged with the hollow shaft 25 is a driven-member 27 of a free-wheel coupling, the driving member 26 of which is formed in one piece with the gear wheel 17. Rollers 28 or other locking members are provided between the driving member 26 and driven member 27 of the free-wheel coupling. A sliding sleeve 29 is splined on the hollow shaft 25 and is capable of sliding under control of the fork 30 from a position (Figure 1) in which its teeth 31 are disengaged from the teeth 32 formed on the input shaft 10 and a position (Figure 2) in which the teeth 31 and 32 are engaged so that the hollow shaft 25 and therefore the free-wheel driven member 27 are driven directly by the input shaft.

The fork 30 is preferably controlled by a solenoid and a return spring so arranged that on energisation of the solenoid the sliding sleeve 29 is withdrawn to the position of Figure 1 and on de-energisation the sleeve 29 can move towards the position of Figure 2 under the action of the return spring.

The gear box construction above described forms the subject matter of concurrent patent application Serial No. 767,903, and it is desirable when the sliding sleeve is moved to the position in which its teeth 31 engage with the teeth 32 of the input shaft, that the input shaft and sleeve 25 should be rotating at the same speed, i. e. they should be in synchronism.

For this purpose there is provided according to this invention co-operating friction discs 33, 34, one of which discs 33 is mounted on and rotates with the input shaft 10, and the other 34 of which is associated with the sliding sleeve 29.

The friction discs 33, 34 are pressed together by a light disc spring 40 so as to provide only a small and substantially constant drag between them. The disc spring 40 bears at its inner edge on the disc 34 and at its outer edge is held by a retainer ring 41 which is spigotted on the disc 33 and is held thereon by peening the edge of the ring in to notches formed in the periphery of the disc 33.

As will be more clearly seen from Figures 4 and 5 the coupling sleeve is formed with a series of slots 35 and the friction disc 34 is formed with a corresponding number of axially directed tails 36 which engage within the slots 35 so that the disc 34 rotates with the sleeve 29 but which are of such width as to permit a slight degree of angular rotation between the disc 34 and the sliding sleeve 29. The tails 36 are also provided with shoulders 37 lying in a plane at right angles to the axis of rotation of the coupling sleeve 29, and which can engage the end face 38 of the coupling sleeve except when the tail 36 lies centrally within the slots 35. The slots 35 are of sufficient width to permit axial movement past the shoulders 37 when the tails are centrally located with respect to the slots.

The operation of this device is similar to that of the normal synchromesh coupling in so far as any difference in the speeds of the coupling sleeve 29 and input shaft 10 provides a drag on the friction disc 34 so that the tails 36 lie to one side or the other of the slots 35 and the intercepting shoulders 37 engage the end face 38 of the sliding sleeve 29 to prevent its axial movement past the shoulders 37 to permit engagement of the teeth 31 with the teeth 32. When, however, the speeds of the input shaft 10 and the sliding sleeve 29 are synchronised the frictional drag between the friction discs 33 and 34 becomes zero and immediately thereafter is reversed as the speed of one coupling member falls below that of the other. The tails 36 therefore move across the width of their respective slots 35 and at the instant at which they are centrally situated within the slots 35 the sliding sleeve 29 can be advanced by axially applied pressure fully to engage the teeth 31 with the teeth 32 thereby ensuring a silent and easy engagement. It will be seen, however, that with the construction of this invention, since the shoulders 37 and the co-operating intercepting face 38 of the sliding sleeve 29 are in planes at right angles to the axis of rotation of the sliding sleeve, the device of this invention functions only as a "recogniser" of synchronism and that there is no cam action on the part of the shoulders 37 and end face 38 during the axial movement of the sliding sleeve 29.

The disc spring 40 ensures that the discs 33, 34 are in engagement when the end face 38 of the sleeve 29 reaches the plane of the shoulders 37, during sliding of the sleeve 29 into the engaged position and ensures that the disc 34 does not move from the baulking position before synchronism of the sleeve and input shaft speeds is reached.

Furthermore it will be seen that as compared with prior constructions in which cone-clutches are used as the friction members the construction of the invention enables the whole coupling to be substantially reduced in size and therefore to be more easily accommodated within a change-speed gear box and also enables the bulk and weight of the gear box to be reduced.

A further advantage of the construction of this invention is that since there is only a small and substantially constant drag between the friction discs no substantial torque is transmitted through them such as is necessary to ensure effective operation of known constructions of synchromesh coupling.

I claim:

1. A coupling mechanism comprising a pair of rotatable coaxial toothed members capable of relative axial movement into and out from engagement with one another; means to apply axial pressure to one at least of said toothed members to effect said relative axial movements; a pair of co-operating friction members whereof the friction surfaces are annular and contained in a plane at right angles to the axis of the toothed members, said friction members being connected to rotate one with each of said toothed members, one of said toothed members having formed therein a number of axially-directed slots and having at the end of each slot an intercepting face which is contained in a plane at right angles to the axis of rotation of the toothed members, and the friction member rotatable with said one of the toothed members having a number of axially-extending tails disposed radially inwards from its friction surface, there being one tail for each of said slots, said tails each having a portion of a less angular extent than its associated slot, said portion being normally engaged within its associated slot to permit a limited rotative freedom of said friction member with respect to said one of the toothed members, and having a wider portion which can only enter its associated slot to permit said axial engaging movement of the toothed members when the tail is centrally disposed with respect to its associated slot; said wider portion being formed with an intercepting face contained in a plane at right angles to the axis of rotation of the toothed members, said intercepting face being arranged to co-operate with the intercepting face at the end of its associated slot to prevent said wider portion entering the slot until the tail is centrally disposed with respect to its slot; and spring means arranged lightly to press the friction members into contact with one another.

2. A coupling mechanism as claimed in claim 1 having the friction members in the form of annular discs and having the spring means arranged to give a small and substantially constant drag between the discs during relative rotation of the discs.

3. A coupling mechanism as claimed in claim 2 comprising also a retaining ring secured on one of said discs and encircling the other of said discs and having the spring means in the form of an annular spring disc bearing by its outer edge against the retaining ring and by its inner edge against said other spring disc thereby to press the friction discs lightly together.

4. In a change speed gear of the class comprising an input shaft, an output shaft, and a plurality of selectively engageable trains of gears between said input shaft and said output shaft, whereof one gear train at least comprises an overrunning coupling having a driving member rotatively engaged with a gear member of said train and a driven member arranged for rotative engagement with said output shaft, the combination with said driven member of coupling means for connecting said driven member to said input shaft to be driven at a speed higher than said driving member, said coupling means including a first toothed member arranged to be driven from the input shaft; a second toothed member rotatively engaged with said driven member; said toothed members being capable of axial relative movement into and out from engagement with one another; means to apply axial pressure to one at least of said toothed members to effect said relative axial movement; a pair of co-operating friction members whereof the friction surfaces are annular and contained in a plane at right angles to the axis of rotation of said toothed members, said friction members being arranged to rotate one with each of said toothed members; one of said toothed members having formed therein a number of axially-directed slots and having at an end of each slot an intercepting face which is contained in a plane at right angles to the axis of rotation of the toothed members, and the friction member which rotates with said one of the toothed members having a number of axially-extending tails disposed radially inwards from its friction surface, there being one tail for each of said slots; said tails each having a portion of less angular extent than its associated slot, said portion being normally engaged within its associated slot to permit a limited rotational freedom of the friction member with respect to said one of the toothed members and a wider portion having an angular extent such that it can only enter a slot to permit axial engaging movement of the toothed members when the tail is centrally disposed with respect to its associated slot, said wider portion being formed with an intercepting face contained in a plane at right angles to the axis of rotation of the toothed members, the intercepting face being arranged to co-operate with the intercepting face at the end of its associated slot to prevent said wider portion entering the slot until the tail is centrally disposed with respect to its slot; and spring means to press the friction members lightly together.

5. A combination as claimed in claim 4 having the friction members in the form of annular discs and having the spring means arranged to give a small and substantially constant drag between the discs during relative rotation of the discs.

6. A combination as claimed in claim 5 comprising also a retaining ring secured on one of said discs and encircling the other of said discs and having the spring means in the form of an annular spring disc bearing by its outer edge against the retaining ring and by its inner edge against said other spring disc thereby to press the friction discs lightly together.

FRANK HENRY TARLTON.

REFERENCES CITED

The following references are of record in the file of this patent:

UNITED STATES PATENTS

| Number | Name | Date |
|---|---|---|
| 1,950,163 | Cotterman | Mar. 6, 1934 |
| 1,969,289 | Ackerman | Aug. 7, 1934 |
| 2,134,316 | Rauen | Oct. 25, 1938 |
| 2,369,842 | Neracher et al. | Feb. 20, 1945 |
| 2,369,843 | Neracher et al. | Feb. 20, 1945 |
| 2,384,439 | Carnagua | Sept. 11, 1945 |
| 2,397,344 | Fishburn | Mar. 26, 1946 |